United States Patent [19]

Schwarz et al.

[11] Patent Number: 4,708,588
[45] Date of Patent: Nov. 24, 1987

[54] TURBINE COOLING AIR SUPPLY SYSTEM

[75] Inventors: Frederick M. Schwarz, Glastonbury; James G. Griffin, West Hartford, both of Conn.

[73] Assignee: United Technologies Corporation, Hartford, Conn.

[21] Appl. No.: 682,042

[22] Filed: Dec. 14, 1984

[51] Int. Cl.⁴ .............................................. F04D 29/58
[52] U.S. Cl. ..................................... 415/115; 415/116
[58] Field of Search .............. 415/115, 116, 178, 175, 415/180, 134–139; 416/90, 95

[56] References Cited

U.S. PATENT DOCUMENTS

| | | | |
|---|---|---|---|
| 716,765 | 12/1902 | Sargent | 415/117 |
| 1,941,361 | 12/1933 | Moody | 415/116 |
| 2,385,967 | 10/1945 | Coffelt | 415/175 |
| 2,798,657 | 7/1957 | Darrow | 415/116 |
| 2,811,833 | 11/1957 | Broffitt | 415/116 |
| 3,011,693 | 12/1961 | Downs et al. | 415/116 |
| 3,768,921 | 10/1973 | Brown et al. | 415/116 |
| 3,936,215 | 2/1976 | Hoff | 415/115 |
| 3,975,901 | 8/1976 | Hallinger et al. | 415/115 |
| 3,980,411 | 9/1976 | Crow | 415/1 |
| 3,990,812 | 11/1976 | Radtke | 416/95 |
| 4,103,899 | 8/1978 | Turner | 277/1 |
| 4,178,129 | 12/1979 | Jenkinson | 416/95 |
| 4,236,869 | 12/1980 | Laurello | 416/95 |
| 4,288,201 | 9/1981 | Wilson | 415/115 |
| 4,296,599 | 10/1981 | Adamson | 415/115 |
| 4,378,960 | 4/1983 | Lenz | 415/115 |
| 4,397,471 | 8/1983 | Feldman et al. | 277/27 |
| 4,416,111 | 11/1983 | Lenahan et al. | 415/115 |
| 4,425,079 | 1/1984 | Speak et al. | 415/180 |
| 4,435,123 | 3/1984 | Levine | 416/95 |
| 4,447,190 | 5/1984 | Campbell | 415/115 |
| 4,466,239 | 8/1984 | Napoli et al. | 416/116 |
| 4,487,016 | 12/1984 | Schwarz et al. | 415/138 |

Primary Examiner—Robert E. Garrett
Assistant Examiner—John Kwon
Attorney, Agent, or Firm—Robert C. Walker

[57] ABSTRACT

Apparatus for supplying pressurized cooling air to the turbine blades (20) of a gas turbine engine is disclosed. Multiple nozzles (38 and 40) of a tangential on-board injection system for pressurizing the cooling air are staged to provide variable rates of cooling airflow to the blades.

4 Claims, 2 Drawing Figures

TURBINE COOLING AIR SUPPLY SYSTEM

TECHNICAL FIELD

This invention relates to gas turbine engines having coolable turbine rotor assembly components.

The concepts were developed for specific applicability in the supply of cooling air to the rotor blades of the assembly, but may have broader applicability as well.

BACKGROUND ART

In gas turbine engines to which the invention disclosed herein applies, fuel is burned within a combustion chamber to produce a hot effluent. The effluent is expanded within a turbine section across alternating rows of stationary stator blades and rotating rotor blades to produce useable power. Effluent temperatures at the initial rows of vanes and blades commonly exceed two thousand degrees Fahrenheit (2000° F.) (1093.3° C.). Blades and vanes susceptible to damage by the hot effluent are cooled by air compressed upstream within the engine and flowed to the turbine for cooling.

One substantial problem associated with such systems is the transfer of cooling air from stationary cavities within the engine stator to the rotor assembly for subsequent distribution to the interior of the rotor blades. U.S. Pat. No. 3,768,921 to Brown et al. entitled "Chamber Pressure Control Using Free Vortex Flow"; U.S. Pat. No. 3,990,812 to Radtke entitled "Radial Inflow Blade Cooling System"; U.S. Pat. No. 4,178,129 to Jenkinson entitled "Gas Turbine Engine Cooling System"; U.S. Pat. No. 4,236,869 to Laurello entitled "Gas Turbine Engine Having Bleed Apparatus With Dynamic Pressure Recovery"; and U.S. Pat. No. 4,435,123 to Levine entitled "Cooling System for Turbines" disclose concepts related to the present invention for effecting such distribution.

Notwithstanding the availability of such concepts, scientists and engineers within the gas turbine industry have continued to search for yet improved concepts, and particularly for concepts making more judicious use of cooling air supplied or reducing supplied airflows which are in excess of that required.

DISCLOSURE OF INVENTION

According to the present invention, the amount of cooling air flowable to the turbine blades of a gas turbine engine is made variable in response to the blade requirements by enabling the opening and closing of a portion of the injectors of a tangential on-board injection system supplying cooling air to the rotor assembly.

Primary features of the present invention include the first injectors and the second injectors of the tangential on-board injection system. Injectors of both sets are spaced circumferentially about the engine with the second injectors in the embodiment described being spaced radially outwardly of the first injectors. An annular ring at the upstream end of the second injectors has a plurality of orifices corresponding in flow area and spacing to the flow area and spacing of the second injectors. Actuator means are capable of rotating the ring such that the orifices align with the second injectors at conditions of maximum cooling flow requirement and are in misalignment at conditions requiring a lesser airflow.

This invention is predicated in part upon the recognition that excessive amounts of cooling air are conventionally flowed to cooled turbine blades at cruise conditions such that an adequate flow will be available at maximum power conditions. A principal advantage of the present invention is the substantial reduction in the volume of cool air utilized to cooling the turbine blades at cruise conditions and a substantial reduction in cooling air utilized over the engine flight cycle.

The foregoing, features and advantages of the present invention will become more apparent in light of the following description of the best mode for carrying out the invention and the accompanying drawing.

BEST MODE FOR CARRYING OUT THE INVENTION

Figure 1:
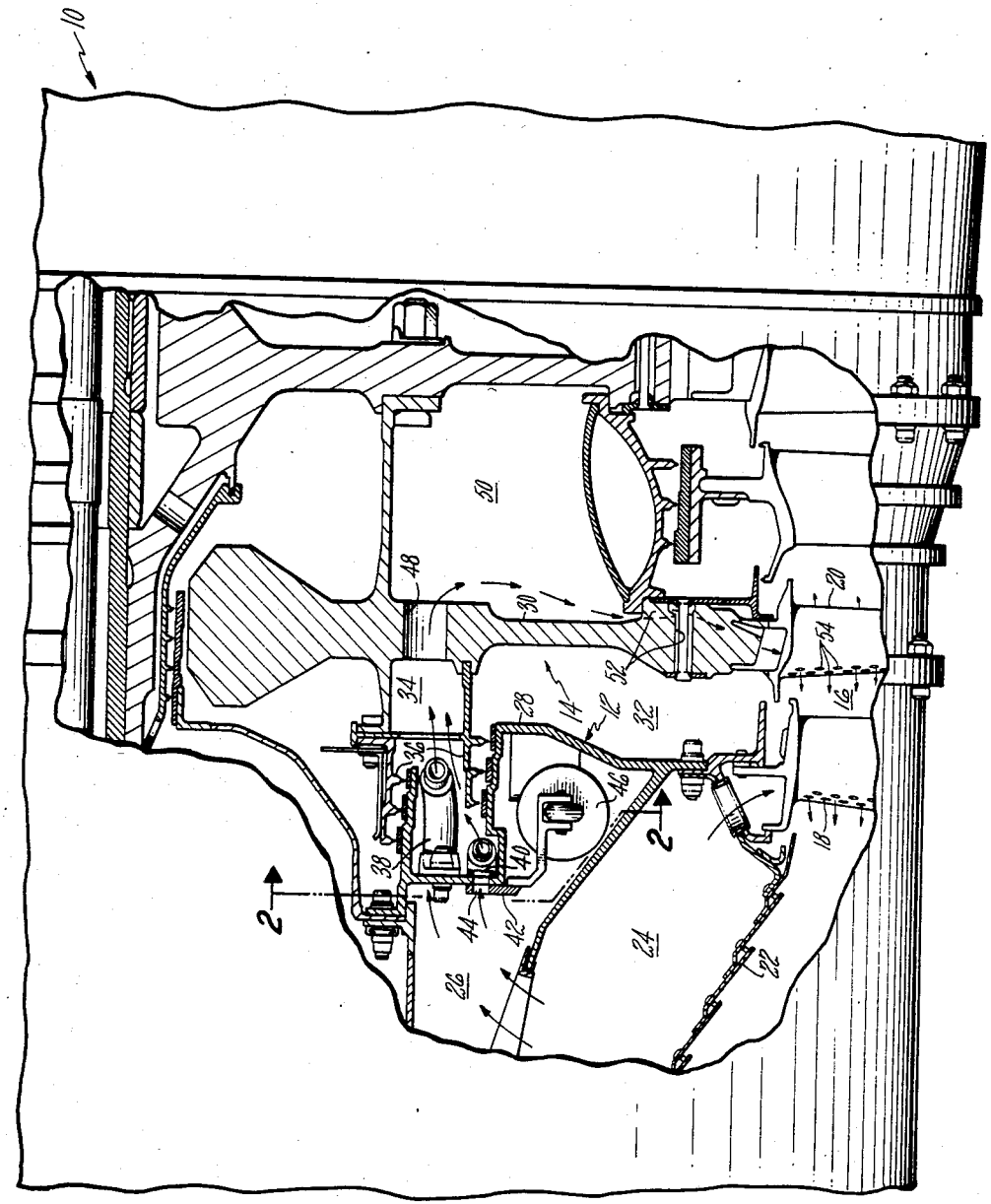
FIG. 1 is a simplified illustration of a portion of the turbine section of a gas turbine engine showing apparatus for the distribution of cooling air to the turbine blades.

A simplified portion 10 of the turbine section of a gas turbine engine is shown in FIG. 1. Included within the portion shown is a stator assembly 12 and a rotor assembly 14. A flowpath 16 for working medium gases extends axially between alternating rows of stator vanes, as represented by the single vane 18, and rows of rotor blades, as represented by the single blade 20, from a combustion chamber 22.

Annular cavities 24 and 26 in fluid communication one with the other are formed within the stator assembly 12 and function in part as reservoirs for turbine cooling air. Stator structure 28, forming a portion of the wall of the cavity 24, supports the row of stator vanes 18. The vanes extend radially from the structure across the flowpath for working medium gases. Each vane has a multiplicity of internal cooling passages and surface apertures through which air from the cavity is flowable to cool the vanes.

Figure 2:
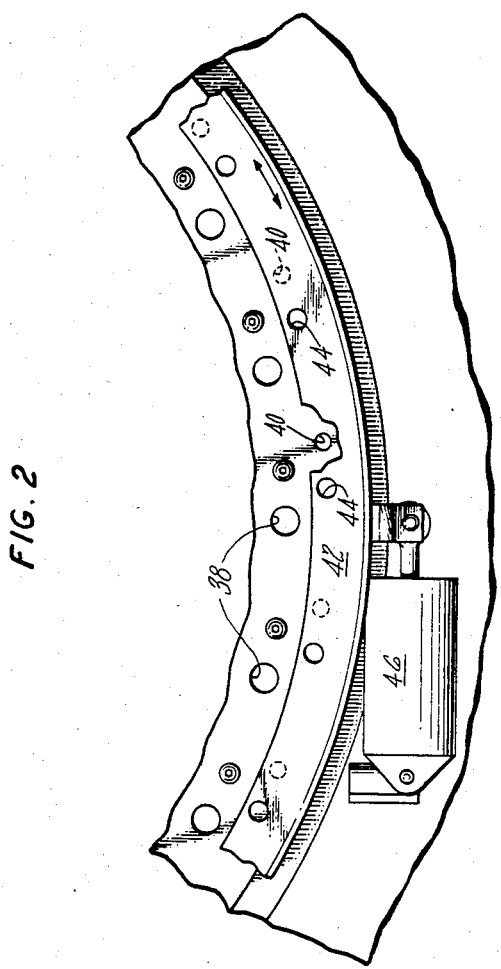
FIG. 2 is a sectional view taken along the line 2—2 as shown in FIG. 1 illustrating the blockage of cooling airflow to the second injectors.

Immediately downstream of the row of vanes 18 is disposed the row of rotor blades 20. The blades extend radially outwardly from a supporting rotor disk 30. Cavities 32 and 34 are formed between the stator structure 28 and the rotor disk 30. The cavity 34 is isolated by labyrinth seals 36 and is capable of being supplied with cooling air from the cavity 26 by a multiplicity of first injectors or nozzles, as representd by the single injector 38. The injector in the embodiment shown are spaced circumferentially about the engine. Additionally, a multiplicity of second injectors or nozzles, as represented by the single injector 40, are capable of supplying additional cooling air from the cavity 26 to the cavity 34. These injectors in the embodiment shown are also spaced circumferentially about the engine. The injectors are referred to in the inducting as "tangential on-board injectors" and their functional operation is described in U.S. Pat. No. 3,768,921 entitled "Chamber Pressure Control Using Free Vortex Flow" to Brown et al. and of common assignee herewith. An annular ring 42 having orifices 44 which are alignable with corresponding injectors 40 is disposed in abutting relationship to the structure 28 from which the injectors are supported. As shown in FIG. 2, the ring 42 is rotatable by actuator means 46 to a position such that the orifices 44 and injectors 40 are in alignment and is rotatable by the actuator means to a position such that the plate blocks cooling air otherwise flowable to the injectors 40.

The rotor disk 30 has a plurality of holes, as represented by the single hole 48 shown in FIG. 1, through which cooling air is flowable from the cavity 34 to an interior cavity 50 within the rotor assembly 14. Passages 52 in the disk enable the flow of coolng air to the turbine blades supported by the disk. Each of the blades has a multiplicity of internal cooling passages and surface apertures 54 through which air is flowable to cool the blades.

The volume of cooling flow required to cool the turbine blades 20 varies with the engine for which the blades are designed. In modern engines, the temperature of the working medium gases is likely to exceed two thousand degrees Fahrenheit (2000° F.) (1093.3° C.) and an assured supply of cooling air through each of the apertures 54 is required to prevent the backflow of hot medium gases against the surface of the blades or into the interior of the blade through one or more of the apertures. In each such design the pressure of the cooling air supplied to the interior of the blades and the total area of the apertures 52 are proportionately sized to provide the required amount of cooling airflow at the highest engine power level—the hottest turbine airflow conditions.

In the illustrated embodiment of the present invention, the cooling airflow at the highest engine power level is provided through the combined injectors 38 and 40. To provide such flow, the annular ring 42 is positioned by the actuator 46 in such a position that the orifices 44 are in alignment with the second injectors 40. As the engine is throttled to lower power levels and cooling requirements are proportionately decreased, the annular ring 42 is moved circumferentially such that the ring blocks flow to the second injectors 42. Under such a condition, flow into the cavity 34 and subsequently the volume of the air supplied to the turbine blades 20 is decreased.

As described, function of the second injectors 42 is from the fully "on" to fully "off" condition. At intermediate cooling requirements, the orifices 44 may be positioned by the actuator 46 in varied degrees of alignment with the second injectors to provide intermediate degrees of cooling airflow restriction.

Reductions in the amount of cooling air flowed to protect components of the turbine are substantial and are estimated to be on the order of ten percent (10%) of the total cooling airflow when compared to turbines with conventional cooling supply systems. A dominant portion of the flight cycle is spent at altitude cruise conditions where turbine blade cooling requirements are approximately seventy percent (70%) of a normal take-off condition requirement. Reducing flow or blocking flow to appropriately sized second injectors 40, matches the amount of air flowed at cruise conditions to the seventy percent (70%) requirement and the ten percent (10%) savings in total airflow results.

Although this invention has been shown and described with respect to detailed embodiments thereof, it will be understood by those skilled in the art that various changes in form and detail thereof may be made without departing from the spirit and scope of the claimed invention.

We claim:

1. In a gas turbine engine of the type having coolable rotor blades and having means for the supply of cooling air to such blades including tangential on-board injectors fixed to the stator assembly of the engine between a source of cooling air and the engine rotor assembly for directing cooling flow against the rotor assembly in the direction of rotation of the rotor assembly and passages internally of the rotor assembly for directing flow subsequently to the rotor blades, wherein the improvement comprises means for varying the amount of cooling air to the rotor blade, including;
   a first plurality of said injectors spaced circumferentially about the engine and capable of discharging cooling air to a cavity at the downstream ends thereof,
   a second plurality of said injectors spaced circumferentially about the engine and capable of discharging cooling air to said cavity at the downstream ends of the first plurality of injectors, and
   means for restricting the flow of cooling air to said second injectors at engine operating conditions requiring less than maximum cooling flow.

2. The invention according to claim 1 wherein said means for restricting the flow of cooling air to said second injectors comprises an annular ring disposed against the upstream ends of said second injectors and having a plurality of orifices and wherein said ring is rotatable circumferentially about the engine such that orifices of the ring are in substantial alignment with the second injectors so as to permit the restriction of cooling airflow through said second injectors at engine operating conditions requiring less than maximum cooling flow.

3. In a gas turbine engine having a rotor assembly and a stator assembly the improvement which comprises:
   a rotor assembly having a rotor disk supporting a plurality of coolable rotor blades extending outwardly therefrom and having defined within the assembly a cavity capable of receiving cooling air for subseqeunt distribution to said rotor blades, the disk having holes thereacross in communication with the cavity;
   stator structure supporting a plurality of first injectors and a plurality of second injectors, and defining a cavity at the upstream ends thereof to which cooling air is flowable for subsequent distribution to the rotor assembly of the engine;
   sealing apparatus extending from the stator structure and from the rotor assembly to form a cavity therebetween about the downstream ends of said injectors and in fluid communication through the disk holes with the cavity of the rotor assembly; and
   means disposed across the upstream ends of said second injectors and capable of blocking the flow of cooling air from the cavity within the stator structure to said second injectors in response to reduced turbine blade requirements for cooling airflow.

4. The invention according to claim 3 wherein, said means capable of blocking the flow of cooling air to the second injectors comprises an annular ring having orifices spaced in circumferential correspondence to the spacing of said second injectors and means for rotating the ring circumferentially about the engine in response to turbine blade requirements for cooling airflow such that at maximum flow requirement, the orifices and second injectors are in full alignment and at minimum flow requirement, the second injectors are fully blocked by the annular ring.

* * * * *